(12) United States Patent
Miliani et al.

(10) Patent No.: US 12,467,405 B2
(45) Date of Patent: Nov. 11, 2025

(54) OXYFUEL TURBINE SYSTEM AND METHOD FOR OXIDANT CONTROL

(71) Applicant: NUOVO PIGNONE TECNOLOGIE -S.R.L., Florence (IT)

(72) Inventors: Alessio Miliani, Florence (IT); Alessandro Zucca, Florence (IT); Lorenzo Cosi, Florence (IT); Francesco Gamberi, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 0 days.

(21) Appl. No.: 18/838,880

(22) PCT Filed: Feb. 23, 2023

(86) PCT No.: PCT/EP2023/025084
§ 371 (c)(1),
(2) Date: Aug. 15, 2024

(87) PCT Pub. No.: WO2023/160876
PCT Pub. Date: Aug. 31, 2023

(65) Prior Publication Data
US 2025/0188876 A1    Jun. 12, 2025

(30) Foreign Application Priority Data

Feb. 23, 2022  (IT) .......................... 102022000003377
Jan. 30, 2023  (IT) .......................... 102023000001410

(51) Int. Cl.
*F02C 3/34*    (2006.01)
*F02C 3/20*    (2006.01)
(Continued)

(52) U.S. Cl.
CPC .................. *F02C 3/34* (2013.01); *F02C 3/20* (2013.01); *F02C 3/22* (2013.01); *F02C 6/18* (2013.01);
(Continued)

(58) Field of Classification Search
CPC ...... F02C 3/20; F02C 3/22; F02C 3/34; F02C 6/18; F02C 7/08; F02C 7/10; F02C 7/22;
(Continued)

(56) References Cited

U.S. PATENT DOCUMENTS 2,745,251  A  *  5/1956  Schirmer
6,105,370  A  *  8/2000  Weber ........................ F02C 7/14
                                                                        60/260
(Continued)

FOREIGN PATENT DOCUMENTS

JP        H1172009 A      3/1999
JP        2015025418 A    2/2015
(Continued)

*Primary Examiner* — Jason H Duger
(74) *Attorney, Agent, or Firm* — Paul Frank + Collins P.C.

(57) ABSTRACT

The gas turbine system comprises a combustor adapted to combust a fuel and an oxidant and generate pressurized hot combustion gas and a turbine fluidly coupled to the combustor and rotated by expansion of the pressurized hot combustion gas from the combustor. A heat exchanger is fluidly coupled to the turbine and adapted to cool expanded combustion gas exhausted from the turbine. A main oxidant supply line is adapted to supply oxidant to the combustor through the heat exchanger. The oxidant streaming through the heat exchanger is in heat exchange relationship with combustion gas exhausted from the turbine. A fuel supply line supplies fuel to the combustor. A secondary oxidant supply line is adapted to supply oxidant in the fuel supply
(Continued)

line upstream of a fuel control valve. Also disclosed is a method of operating the system.

14 Claims, 4 Drawing Sheets

(51) Int. Cl.

| | | |
|---|---|---|
| *F02C 3/22* | (2006.01) | |
| *F02C 6/18* | (2006.01) | |
| *F02C 7/08* | (2006.01) | |
| *F02C 7/10* | (2006.01) | |
| *F02C 7/22* | (2006.01) | |
| *F02C 7/232* | (2006.01) | |
| *F02C 7/236* | (2006.01) | |
| *F23R 3/28* | (2006.01) | |

(52) U.S. Cl.
CPC ................ *F02C 7/08* (2013.01); *F02C 7/10* (2013.01); *F02C 7/22* (2013.01); *F02C 7/222* (2013.01); *F02C 7/232* (2013.01); *F02C 7/2365* (2013.01); *F23R 3/28* (2013.01); *F05D 2260/61* (2013.01); *F05D 2270/08* (2013.01); *F05D 2270/306* (2013.01)

(58) Field of Classification Search
CPC ........ F02C 7/222; F02C 7/232; F02C 7/2365; F05D 2260/61; F05D 2270/08; F05D 2270/306; F23R 3/28
See application file for complete search history.

(56) References Cited

U.S. PATENT DOCUMENTS

| | | |
|---|---|---|
| 2010/0229525 A1 | 9/2010 | Mackay et al. |
| 2015/0020497 A1* | 1/2015 | Iwai .......................... F02C 3/34 60/39.23 |
| 2016/0090911 A1* | 3/2016 | Iwai .......................... F02C 7/10 60/39.461 |
| 2017/0175624 A1* | 6/2017 | Iwai .......................... F02C 3/34 |
| 2020/0025089 A1* | 1/2020 | Nakamura ............... F23N 1/022 |
| 2020/0284194 A1 | 9/2020 | Iwai et al. |
| 2023/0417413 A1* | 12/2023 | Kasuya ..................... F02C 3/30 |
| 2025/0188876 A1 | 6/2025 | Miliani et al. |

FOREIGN PATENT DOCUMENTS

| | | |
|---|---|---|
| KR | 101 067 710 B1 | 9/2011 |
| RU | 2678608 C2 | 1/2019 |
| RU | 2719257 C2 | 4/2020 |

\* cited by examiner

OXYFUEL TURBINE SYSTEM AND METHOD FOR OXIDANT CONTROL

TECHNICAL FIELD

The present disclosure concerns gas turbine systems for power generation. Embodiments disclosed herein specifically concern oxyfuel turbine systems, i.e. oxy-fuel expander systems, and related methods.

BACKGROUND ART

Fossil fuels are a major source of chemical energy used for the generation of mechanical power. Fossil fuels are mixed with air and combusted to generate a combustion gas at high pressure and temperature, which is expanded in a turbine. The turbine converts combustion gas enthalpy into mechanical power available on the output shaft of the turbine and used to drive a load, such as a compressor or compressor train, or to rotate an electric generator and convert mechanical power into electric power.

One of the major concerns with regard to combustion of fossil fuels relates to the production of carbon dioxide, a greenhouse gas which is considered one of the main contributors of global warming and climate changes.

In an attempt to reduce the environmental impact of power generation through combustion of fossil fuels, the option of post combustion capture of carbon dioxide has been investigated. Carbon dioxide capture facilities have been developed, to process flue gas exhausted from gas turbines and remove carbon dioxide therefrom, prior to discharging the flue gas in the environment. The costs of a carbon dioxide capturing facility are high, both in term of CAPEX, as well as in terms of energy required to run the facility, which reduces the overall thermodynamic efficiency of the system. The percentage of carbon dioxide in flue gas is low; this requires large volumes of flue gas to be processed through the carbon dioxide capturing facility and renders the capturing process particularly inefficient.

In recent years oxy-combustion turbines, also known as oxy-fuel turbines or oxy-fuel expanders, have been developed, which use an oxidant stream consisting mainly of oxygen ($O_2$), or a mixture of oxygen and carbon dioxide ($CO_2$) instead of air. Oxygen is obtained by separation from ambient air. A portion of flue gas from the gas turbine is recycled in the gas turbine combustor, such that the working fluid supplied to the combustor mainly consists of oxygen and carbon dioxide and does not include nitrogen. The resulting flue gas mainly consists of water and carbon dioxide. Water is removed from the flue gas by condensation and the part of water-free flue gas, which is not recycled to the combustor, can be efficiently processed in a carbon dioxide capturing unit.

The amount of power generated by a power generation plant or system may require to be finely and quickly adjusted to follow variations of the mechanical load applied to the turbine shaft. For instance, when the turbine drives an electric generator connected to an electricity distribution grid, the load applied to the turbine may vary depending upon the amount of electric power absorbed by electric loads connected to the electricity distribution grid and powered therewith. The rotary speed of the turbine and of the electric generator shall remain constant. A fluctuation of the load shall therefore be balanced by an adjustment of the fuel fed to the turbine combustor. Similar adjustment requirements may arise also when the turbine drives a compressor train or any other driven machine. Fuel flowrate fluctuations must be compensated by adjustment of the oxidant flowrate.

Oxi-fuel turbines operate at or near stoichiometric ratio. Flowrate variations required to balance load variations during transients in the turbine operation may cause flame instability.

Efforts have been made to make oxy-fuel turbines reacting faster to load variations and prevent combustion issues arising from fluctuations of the oxidant and fuel flowrates. There is still a need to improve oxy-turbines in this regard.

SUMMARY

To alleviate the drawbacks of the gas turbines of the current art, disclosed herein is an oxy-fuel gas turbine system including a combustor, adapted to combust a fuel and an oxidant and generate pressurized hot combustion gas, and a turbine fluidly coupled to the combustor and rotated by expansion of the pressurized hot combustion gas from the combustor.

The system further includes a heat exchanger fluidly coupled to the turbine and adapted to chill expanded combustion gas exhausted from the turbine. A main oxidant supply line is adapted to supply a main oxidant stream to the combustor through the heat exchanger. In use, the main oxidant stream flowing through the heat exchanger exchanges heat with combustion gas exhausted from the turbine, such that heat is recovered from the combustion gas and used to heat the main oxidant stream and the combustion gas is chilled.

A recycle line is adapted to recycle a first chilled combustion gas stream through the heat exchanger to the combustor as working fluid, while a combustion gas removal line is adapted to exhaust a second chilled combustion gas stream towards a carbon dioxide capturing system, for instance.

A fuel supply line is arranged to supply fuel to the combustor and a secondary oxidant supply line is arranged such as to supply a secondary oxidant stream in the fuel supply line, upstream of a fuel control valve arranged along the fuel supply line, with respect to the direction of flow of the fuel.

When requested by the operating conditions of the system, a supplementary amount of oxidant can therefore be supplied to the combustor through the fuel supply line. By feeding the secondary oxidant stream in a mixing point arranged upstream of the fuel control valve, an improved mixture of oxidant and fuel is obtained. Uniform composition of the oxidant-fuel blend fed to a plurality of fuel nozzles is ensured, which improves the combustion conditions in the combustor.

In some embodiments, the secondary oxidant supply line bypasses the heat exchanger, i.e. it does not extend through the heat exchanger.

In case of a load variation, the flowrate of the secondary oxidant stream can be promptly modulated in response thereto and in combination with a fuel stream variation. For instance, if the load applied to the turbine shaft increases, the fuel flowrate and the oxidant flowrate of the secondary oxidant stream increase, to generate more power and maintain the required rotary speed of the turbine.

Since the changing oxidant flowrate is pre-mixed with the fuel prior to entering the combustor, enhanced flame stability, specifically in case of load variation is achieved, in combination with a prompt response of the turbine system to such transient.

In embodiments disclosed herein, a secondary oxidant control valve is provided in the secondary oxidant supply line and adapted to modulate a secondary oxidant flowrate through the secondary oxidant supply line during a transient condition of the turbine, i.e. in response to a turbine load variation. Since no heat exchanger is provided along the secondary oxidant supply line, the secondary oxidant control valve can be located near the fuel supply line, such as to minimize the oxidant volume between the secondary oxidant control valve and the combustor. This is beneficial in terms of readiness of the system in adapting to variable operating conditions, i.e. in case of load variations.

The system can further include a main oxidant control valve in the main oxidant supply line and a control unit. The control unit can be adapted to selectively open and close the secondary oxidant control valve and the main oxidant control valve in response to a load variation on the turbine. The secondary oxidant control valve can be acted upon first and the main oxidant control valve can be acted upon in a second step of an oxidant flowrate adjustment sequence, to obtain faster adaptation of the oxidant flowrate to a load fluctuation.

According to a further aspect, disclosed herein is method for operating a turbine system. The method includes the following steps:

supplying a fuel stream to a combustor through a fuel supply line;
supplying a main oxidant stream to the combustor through a heat exchanger;
combusting fuel from the fuel supply line and oxidant in the combustor and generating a stream of hot pressurized combustion gas;
expanding the combustion gas in a turbine and generating mechanical power therewith;
exhausting combustion gas from the turbine;
flowing the exhausted combustion gas in the heat exchanger in heat exchange with the main oxidant stream, whereby the combustion gas is chilled and the main oxidant stream is heated;
recycling a first chilled combustion gas stream through the heat exchanger to the combustor as working fluid and discharging a second chilled combustion gas stream.
supplying a secondary oxidant stream to the fuel stream and blending the secondary oxidant stream in the fuel stream; and
supplying the blend of oxidant and fuel to the combustor.

In embodiments disclosed herein, the method further includes the step of modulating a flowrate of the secondary oxidant stream in response to a load variation on the turbine.

Specifically, in some embodiments, the method comprises the following steps:

increasing or decreasing a secondary oxidant flowrate through a secondary oxidant control valve in response to an increase or decrease of the load on the turbine;
subsequently decreasing or increasing the secondary oxidant flowrate through the secondary oxidant control valve and simultaneously increasing or decreasing a main oxidant flowrate through a main oxidant control valve, maintaining an approximately constant oxidant flowrate to the combustor.

Further features and embodiments of the system and of the method according to the present disclosure are described below with reference to the enclosed drawings and are set out in the attached claims.

BRIEF DESCRIPTION OF THE DRAWINGS

Reference is now made briefly to the accompanying drawings, in which.

DETAILED DESCRIPTION

In order to achieve a quicker response to load variations of a turbine in an oxy-fuel turbine system and improved flame stability during transients of the oxy-fuel turbine, an additional or secondary oxidant supply line is fluidly coupled directly to the fuel supply line. To enhance the combustion conditions, the secondary oxidant flowrate supplied to the fuel supply line is introduced in the fuel stream upstream of the fuel control valve. This ensures, for instance, that the same fuel-oxidant blend composition is fed to all fuel nozzles and burners of the combustor.

The secondary oxidant supply line can be arranged such as to bypass the heat recovery heat exchanger.

A control valve on the secondary oxidant supply line is operated via a controller to modulate the flowrate of a secondary oxidant flowrate added directly to the fuel stream into the combustor to quickly adapt the operation of the turbine system to rapid fluctuations of the load applied to the turbine shaft.

Figure 1:
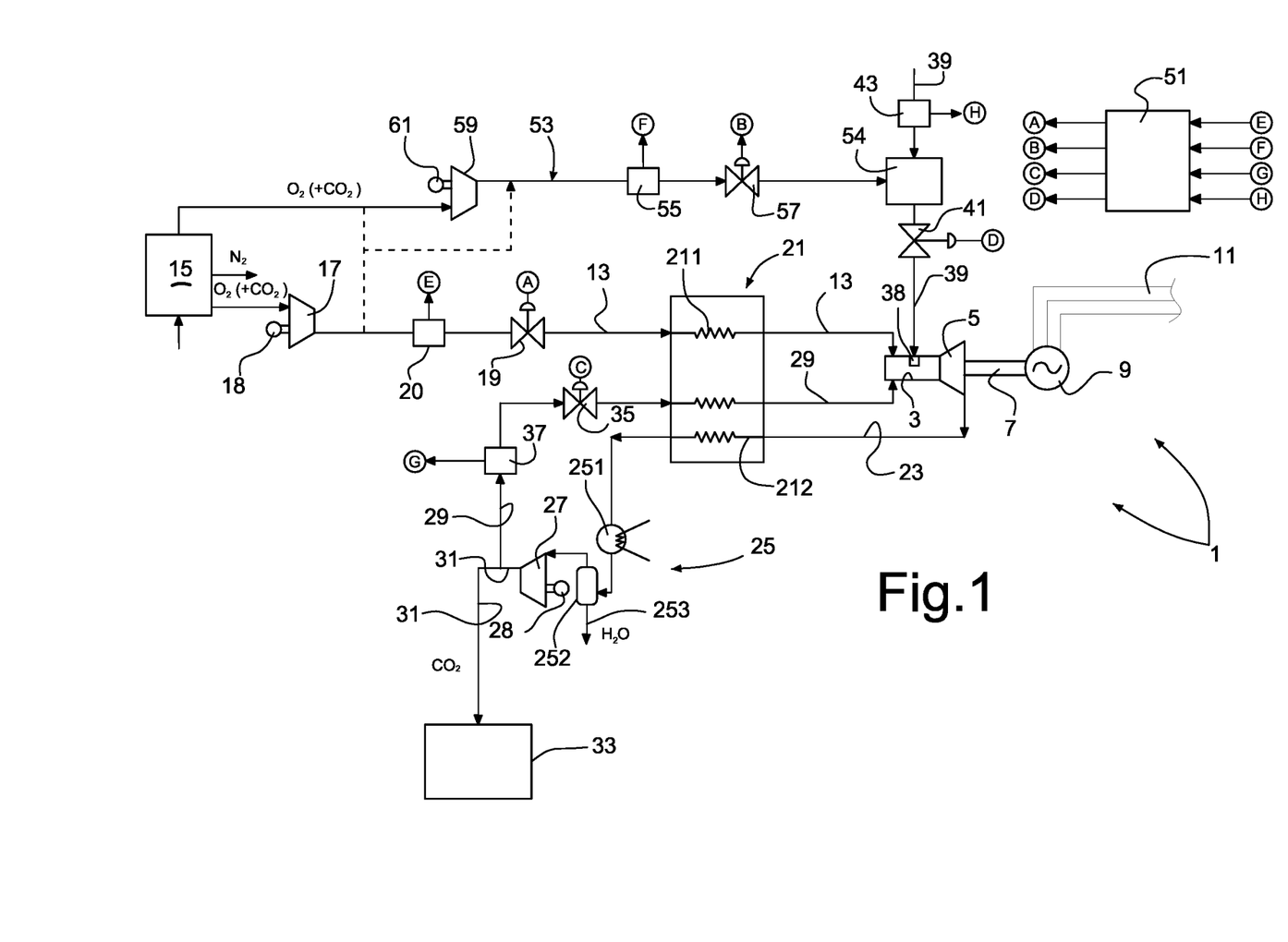
FIG. 1 is a schematic of an oxy-fuel turbine system according to the present disclosure.

Turning now to the drawings, FIG. 1 shows the schematic of an oxy-fuel turbine system 1 according to the present disclosure. The turbine system 1 includes a combustor 3 fluidly coupled to an expander or turbine 5. The rotary turbomachine 5 will be referred to herein as "turbine".

The turbine 5 generates mechanical power by expansion of a combustion gas and is drivingly coupled through a shaft 7 to a load 9. The load 9 is driven into rotation by mechanical power generated by the turbine 5. In the exemplary embodiment of FIG. 1 the load 9 includes an electric generator, electrically coupled to an electricity distribution grid 11.

A main oxidant stream is supplied to the combustor 3 through a main oxidant supply line 13. The main oxidant stream consists mainly of oxygen or a mixture of oxygen and carbon dioxide. The oxidant may be supplied by any oxidant source. In some embodiments, carbon dioxide can be blended with oxygen in the oxidant supply line or in the oxidant source 15, such that the oxidant flow contains a reduced amount of oxygen, for instance around 20% in volume of oxygen.

In FIG. 1 an oxidant source includes an air separation unit 15, which separates oxygen, or a blend of oxygen and carbon dioxide, from ambient air, removing nitrogen, or nitrogen and carbon dioxide, therefrom. The main oxidant stream from the oxidant source 15 can be pressurized in a first oxidant compressor 17 up to a pressure required for supplying the oxidant in the combustor 3. The first oxidant compressor 17 can be driven by a driver, such as an electric motor 18. The electric motor 18 can be powered by electric power from the electricity distribution grid 11. In other embodiments, not shown, the first oxidant compressor 17 can be driven directly by the turbine 5. In such case the first oxidant compressor 17 can be part of the load drivingly coupled to the turbine shaft 7.

A main oxidant control valve 19, which is arranged along the main oxidant supply line 13 between the first oxidant compressor 17 and the combustor 3, is adapted to control a first oxidant flowrate through the main oxidant supply line 13 towards the combustor 3. A main oxidant flowmeter 20 can be arranged in the main oxidant supply line 13, to detect the main oxidant flowrate flowing through the main oxidant supply line 13 towards the combustor 3.

The main oxidant stream supplied through main oxidant supply line 13 flows through a cold side 211 of a heat exchanger 21 in heat exchange relationship with combustion gas (flue gas) exhausted from the turbine 5, to recover heat therefrom, as explained in more detail below. The combustion gas exhausted from the turbine 5 flows through a hot side 212 of the heat exchanger 21.

The hot side 212 of the heat exchanger 21 has an inlet fluidly coupled to the discharge of the turbine 5 through a combustion gas discharge line 23. The expanded combustion gas exhausted from the turbine 5 exchanges heat against the main oxidant stream flowing through the main oxidant supply line 13, such that low-temperature heat contained in the combustion gas exhausted from the turbine 5 is at least partly recovered and used to pre-heat the main oxidant stream prior to entering the combustor 3, while the combustion gas is chilled.

The outlet of the hot side 212 of the heat exchanger 21 is fluidly coupled to a water removal arrangement 25, adapted to remove water from the chilled combustion gas discharged from the hot side 212 of the heat exchanger 21. In the schematic of FIG. 1, the water removal arrangement 25 comprises a condenser 251 and a water/gas separator 252. The combustion gas flowing through the condenser 251 is chilled, such that steam contained in the combustion gas condenses, separates from the gas in the water/gas separator 252 and is removed through a water removal line 253.

Since the oxidant fed to the combustor mainly consists of oxygen, or a blend of oxygen and carbon dioxide, and the oxidant flowrate as well as the fuel flowrate are controlled such as to have stoichiometric combustion conditions in combustor 3, the resulting flue gas exhausted from the turbine 5 consists mainly of carbon dioxide and water. The latter is removed by the water removal arrangement 25. The chilled combustion gas exhausted from the water/gas separator 252 consists, therefore, mainly of carbon dioxide.

The chilled combustion gas from the water/gas separator 252 is compressed by a combustion gas compressor 27 and split into a first chilled combustion gas stream and a second chilled combustion gas stream. The combustion gas compressor 27 can be driven by the turbine 5 or by a driver 28, such as an electric motor, which can be powered by electric power from the electricity distribution grid 11, for instance.

The first chilled combustion gas stream supplied by the gas/water separator is recycled towards the heat exchanger 21 and the combustor 3 via a recycle line 29. The recycle line 29 branches from a combustion gas removal line 31. In the embodiment of FIG. 1 the combustion gas removal line 31 is fluidly coupled to a carbon dioxide capturing unit 33, which processes the second chilled combustion gas stream delivered from water/gas separator 252, e.g., to suitably store carbon dioxide and prevent discharge thereof in the environment.

The first chilled combustion gas stream, which is recycled through the recycle line 29, streams through a second cold side 213 of the heat exchanger 21 in heat exchange relationship with the hot side 212, to receive heat from the hot combustion gas exhausted from the turbine 5.

The flowrate of the combustion gas recycled through the recycle line 29 can be adjusted through a recycling combustion gas control valve 35. A recycling combustion gas flowmeter 37 can be provided along the recycle line 29, to detect the flowrate of combustion gas recycling towards the combustor 3.

A side stream of carbon dioxide can be branched off from the recycle line 29 or from the dehydrated carbon dioxide flow upstream of the compressor 27, and added to the oxygen stream from the oxidant source 15. As mentioned above, the percentage of oxygen in the line 13 and/or in the line 53 can be reduced to around 20% by volume for the sake of easier handling.

In the combustor 3 the main oxidant stream fed through the main oxidant supply line 13 and the recycled combustion gas supplied through the recycle line 29 are mixed with fuel, for instance a gaseous fuel, which is supplied through a fuel supply line 39 to one fuel nozzles 38, or preferably a plurality of fuel nozzles 38, in the combustor 3. A fuel control valve 41 along the fuel supply line 39 is adapted to adjust the flowrate of fuel delivered to the combustor 3. A fuel flowmeter 43 along the fuel supply line 39 can be provided, to detect the flowrate of the fuel supplied to the combustor 3.

The mechanical power required to rotate the electric generator 9 may fluctuate as a result of fluctuations in the electric power absorbed by electric loads (not shown) connected to the electricity distribution grid 11. Since the rotary speed of the turbine 5 and of the electric generator 9 shall remain constant, a fluctuation of the load must be balanced by accordingly adjusting the fuel flowrate, to prevent angular accelerations or decelerations of the turbine 5 and of the electric generator 9. The fuel flowrate must be adjusted as fast and finely as possible by the fuel control valve 41, under the control of a control unit 51. The latter is functionally coupled to the flowmeters 20, 37, 43 and to the control valves 19, 35 and 41. Functional couplings are pictorially represented by encircled letters (A) to (H).

As mentioned above, the oxidant and fuel molar ratio in the combustor 3 is controlled to maintain stoichiometric combustion conditions and avoid residual fuel or residual oxidant in the combustion gas exhausted from the turbine 5. To maintain a stoichiometric ratio in the combustor 3, a change in the fuel flowrate shall be accompanied by a fast oxidant flowrate adjustment.

The volume between the main oxidant control valve 19 and the combustor 3 includes the cold side 211 of the heat exchanger 21 and is therefore relatively large. An oxidant flowrate adjustment through the main oxidant control valve 19 would result in a delayed adjustment of the oxidant flowrate compared to the fuel flowrate adjustment, following variations of the load applied to the turbine 5. A power rate fluctuation would therefore result in transients, during which the combustor 3 operates with an excess of oxidant or with an excess of fuel.

To avoid or reduce these drawbacks, the oxy-fuel turbine system 1 includes a second, additional oxidant supply line 53, which can include a secondary oxidant flowmeter 55 and a secondary oxidant control valve 57, both functionally coupled to the control unit 51. The secondary oxidant supply line 53 is fluidly coupled at a mixing point 54 to the fuel supply line 39 through the secondary oxidant control valve 57 and is adapted to provide a secondary oxidant stream to the combustor 3 through the fuel supply line 39. The additional oxidant supply line 53 bypasses the heat exchange 21.

In the drawings, the mixing point 54 is shown downstream of the fuel flowmeter 43. In other embodiments, however, the fuel flowmeter 43 can be arranged downstream of the mixing point 54. The fuel flowmeter 43 will detect the flowrate of fuel if the secondary oxidant control valve 57 is closed, or the flowrate of a mixture of secondary oxidant and fuel if the fuel flowmeter 43 is arranged downstream of the mixing point 54.

The flowrate of the secondary oxidant stream flowing through the secondary oxidant supply line 53 can be substantially smaller than the flowrate of the main oxidant stream flowing through the main oxidant supply line 13. Heating the secondary oxidant stream is not required, since sufficient heat recovery is ensured by the heat exchanger 21. Therefore, there is no need for heat exchanging surfaces between the secondary oxidant control valve 57 and the mixing point 54. In other terms, the secondary oxidant control valve 57 can be arranged near the fuel supply line 39, such that the volume between the secondary oxidant control valve 57 and the fuel supply line 39 is minimized. Acting upon the secondary oxidant control valve 57 results in a fast reaction of the system in terms of total oxidant flowrate in the combustor 3.

Moreover, according to the embodiments disclosed herein, the secondary oxidant stream is pre-mixed with fuel upstream of the combustor 3. This results in enhanced flame stability, in particular during load transients, which avoids or reduces the risk of flameout in areas of the combustor 3.

The secondary oxidant supply line 53 can be fluidly coupled to the oxidant source 15 through a second oxidant compressor 59, which can be driven by a driver 61, such as an electric motor. In other embodiments, not shown, the second oxidant compressor 59 can be driven by the turbine 5.

In other embodiments, as shown in dotted lines, the secondary oxidant supply line 53 can branched from the main oxidant supply line 13 downstream the delivery side of the first oxidant compressor 17. The second oxidant compressor 59 can be omitted or can be arranged in series with the first oxidant compressor 17, if a higher oxidant pressure is need in the secondary oxidant supply line 53 than in the main oxidant supply line 13.

While in FIG. 1 the secondary oxidant supply line 53 is fluidly coupled to the oxidant source 15, in other embodiments, not shown, a separate oxidant source can be provided. In some embodiments, pure oxygen can be supplied through the secondary oxidant supply line 53. In other embodiments, an oxygen and carbon dioxide blend can be supplied through the secondary oxidant supply line 53.

During a transient caused by variations of the load on the turbine, the total oxidant flowrate can be modulated by opening or closing the secondary oxidant control valve 57 to rapidly increase or decrease the oxidant flowrate, which is directly added to the fuel stream upstream of the fuel nozzles 38 in the combustor 3. Since the volume between the secondary oxidant control valve 57 and the fuel supply line 39 is small, adjustments of the oxidant flowrate can be as quick as the adjustment of the fuel flowrate, such that the amount of power generated by the turbine 5 can be adapted to the turbine load at the same time maintaining a stoichiometric ratio in the combustor 3.

Figure 2:
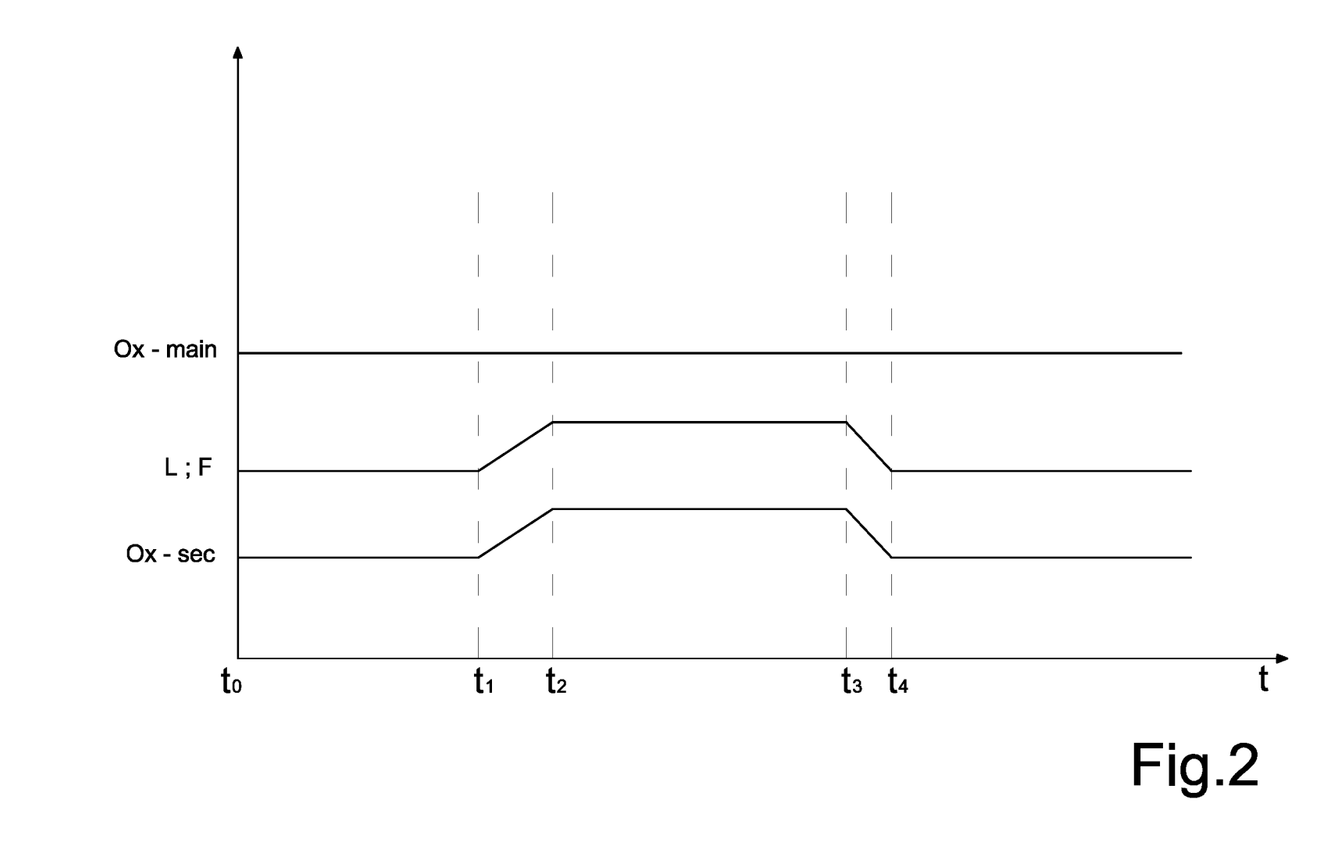
FIGS. 2, 3 and 4 are diagrams illustrating the load, the fuel flowrate and the main and secondary oxidant flowrates over time in the system of FIG. 1.

FIG. 2 illustrates the main oxidant flowrate (OX-main) through the main oxidant supply line 13 and the secondary oxidant flowrate (OX-sec) through the secondary oxidant supply line 53 over time, during a load transient. The load applied to the turbine is pictorially represented by curve L, which also corresponds to the fuel flowrate F. Time t is plotted on the horizontal axis. At time t1 the load applied to the turbine shaft 7 increases, e.g., additional electric loads are connected to the electricity distribution grid 11, or already connected loads require more electric power from the electricity distribution grid 11. The fuel flowrate increases correspondingly.

The fuel flowrate is controlled by control unit 51 based upon a signal detecting a deceleration of the turbine rotation speed. The prompt increase of fuel flowrate by opening the fuel control valve 41 maintains the required rotational speed of the turbine 5 and of the electric generator 9. In order to adapt the oxidant flowrate to the changed fuel flowrate, so that the required additional thermal power is generated as requested to maintain the desired rotary speed of the turbine 5 and the generator 9, the control unit 51 causes a controlled aperture of the secondary oxidant control valve 57 to increase the secondary oxidant flowrate.

At time instant t2 the load increase ends and the increase in oxidant and fuel flowrates also stops.

In the time interval t3-t4 an opposite transient occurs, where the load L decreases, balanced by a decreasing fuel flowrate controlled by the control unit 51. To follow the quick decrease in fuel flowrate and avoid non-stoichiometric combustion in the combustor 3, the secondary oxidant control valve 57 is closed to quickly reduce the oxidant flowrate through the secondary oxidant supply line 53, and thus adapt the total oxidant flowrate to the reduced fuel flowrate.

Slow load changes which do not require a quick adjustment of the fuel and oxidant flowrates can be addressed acting upon the main oxidant control valve 19, rather than upon the secondary oxidant control valve 57.

In some embodiments, it can be beneficial to keep the secondary oxidant control valve 57 in an intermediate operating condition corresponding to an intermediate secondary oxidant flowrate, between zero and a maximum secondary oxidant flowrate (secondary oxidant control valve 57 fully open). This ensures that a quick reaction to a fast load change (either an increasing or a decreasing load) can always be tackled acting upon the secondary oxidant control valve 57.

Figure 3:
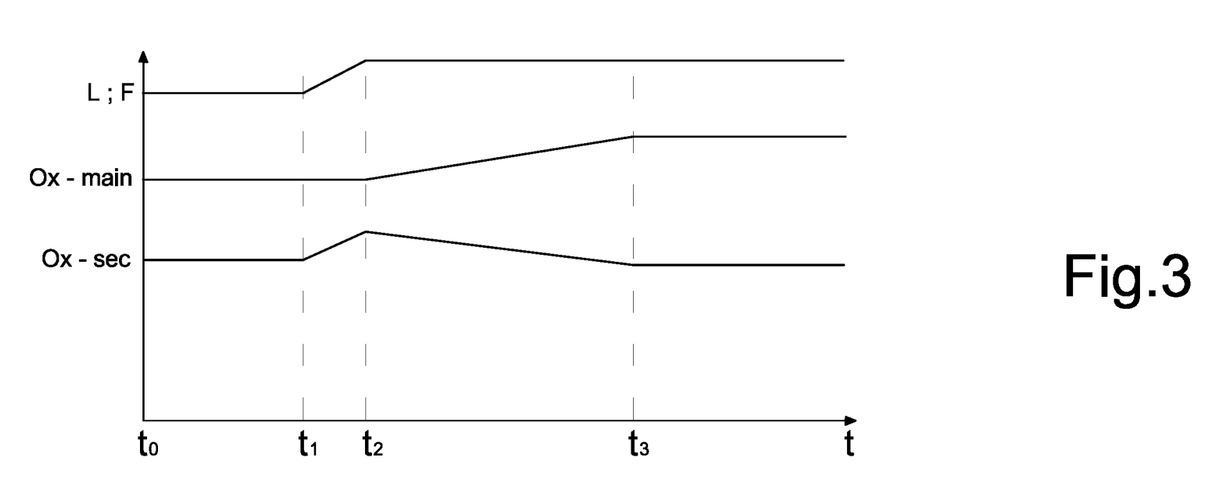
Figure 4:
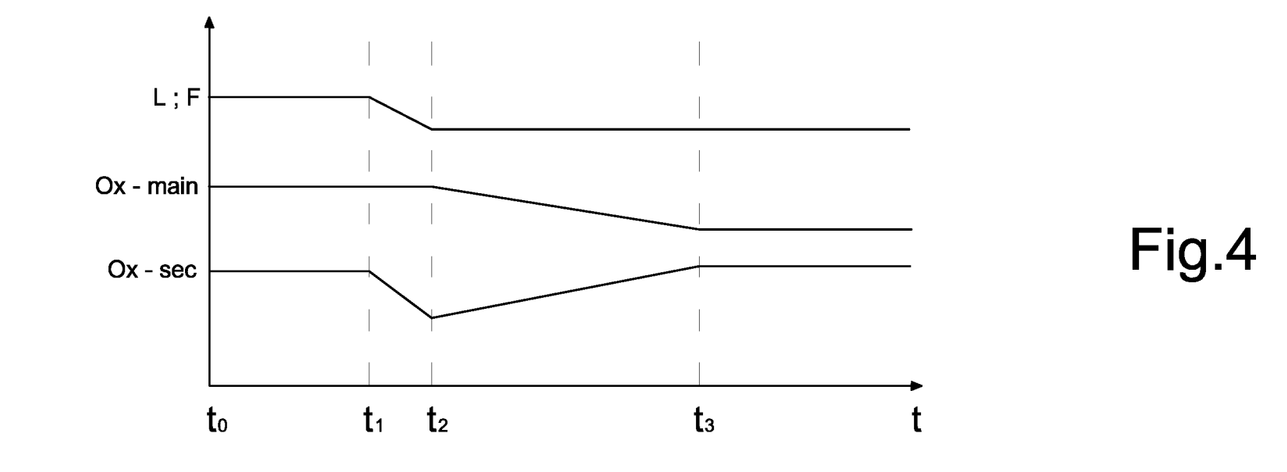

Therefore, it can be beneficial that once the secondary oxidant control valve 57 has been acted upon to balance a sudden increase or decrease of fuel turbine load, the secondary oxidant control valve 57 is slowly brought back to an intermediate operating condition, by either slowly decreasing the secondary oxidant flowrate and simultaneously slowly increasing the main oxidant flowrate through line 19, or by slowly increasing the secondary oxidant flowrate and simultaneously slowly decreasing the main oxidant flowrate. These two transient conditions are shown in the diagrams of FIGS. 3 and 4.

Figure 5:
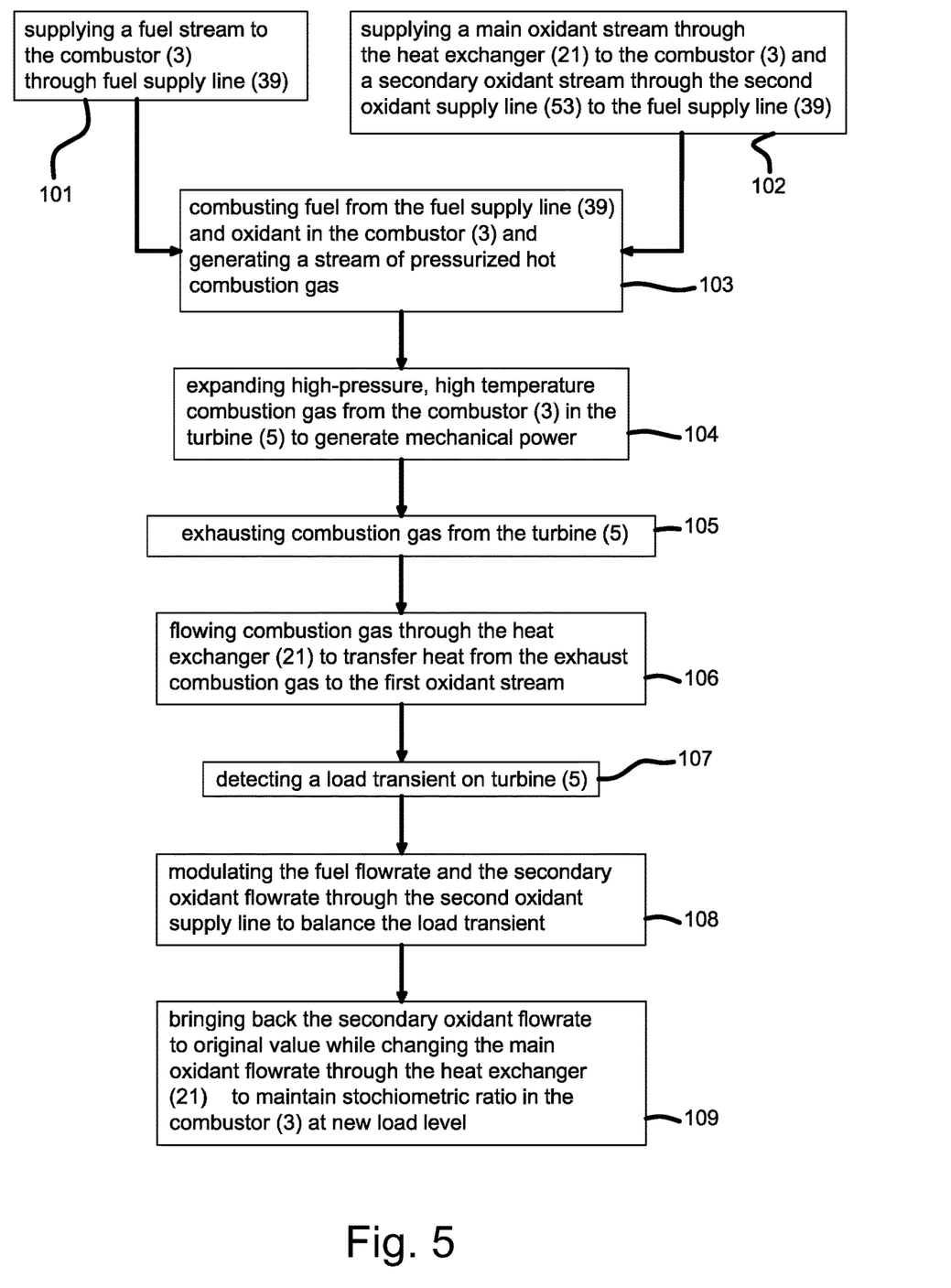
FIG. 5 is a flowchart summarizing the steps of a method according to the present disclosure.

A flowchart summarizing a method of operating the oxy-fuel turbine system of the present disclosure is shown in FIG. 5. The method comprises a step 101 of supplying a fuel stream to the combustor (3) through the fuel supply line (39) and a step 102 of feeding the main oxidant stream to the combustor (3) through the heat exchanger (21) as well as the secondary oxidant stream through the secondary oxidant supply line (53) to the fuel supply line (39). The method further comprises combusting fuel and oxidant from the fuel supply line (39) and oxidant from the heat exchanger (21) in the combustor (3) (step 103) and generating a stream of pressurized hot combustion gas. In step 104 the high-pressure, high-temperature combustion gas from the combustor 3 is expanded in the turbine (5) to generate mechanical power. In step 105 combustion gas is exhausted from the turbine (5). In next step 106 the exhaust combustion gas flows through the heat exchanger (21) to transfer heat from the exhaust combustion gas to the main oxidant stream. In step 107 a load transient on turbine (5) is detected, and (step 108) the oxidant flowrate through the secondary oxidant supply line (53) and the fuel flowrate are modulated in response to the load transient. Once the load transient has terminated and the new load becomes stable, the secondary oxidant flowrate can be gradually brought back to its initial value, while the main oxidant flowrate through the heat exchanger (21) can be changed to maintain the stoichiometric ratio between fuel and oxidant (step 109).

Exemplary embodiments have been disclosed above and illustrated in the accompanying drawings. It will be understood by those skilled in the art that various changes, omissions and additions may be made to that which is specifically disclosed herein without departing from the scope of the invention as defined in the following claims.

The invention claimed is:

1. A gas turbine system (1) comprising:
a combustor adapted to combust fuel and oxidant and generate pressurized hot combustion gas;
a turbine fluidly coupled to the combustor and rotated by expansion of the pressurized hot combustion gas from the combustor;
a heat exchanger fluidly coupled to the turbine and adapted to chill expanded combustion gas exhausted from the turbine;
a main oxidant supply line adapted to supply a main oxidant stream to the combustor through the heat exchanger;
wherein in use the main oxidant stream flowing through the heat exchanger is in heat exchange with the combustion gas exhausted from the turbine, such that heat is transferred from the combustion gas to the main oxidant stream and the combustion gas is chilled;
a recycle line adapted to recycle a first chilled combustion gas stream through the heat exchanger to the combustor as working fluid;
a combustion gas removal line adapted to exhaust a second chilled combustion gas stream;
a fuel supply line adapted to supply the fuel to the combustor;
a fuel control valve along the fuel supply line adapted to adjust a fuel flowrate delivered to the combustor; and
a secondary oxidant supply line coupled to the fuel supply line at a mixing point upstream of the fuel control valve;
wherein the secondary oxidant supply line is adapted to feed a secondary oxidant stream in the fuel supply line.

2. The turbine system of claim 1, wherein the secondary oxidant supply line is arranged such as to bypass the heat exchanger.

3. The turbine system of claim 1, wherein the combustor comprises a plurality of fuel nozzles downstream of the fuel control valve.

4. The turbine system of claim 1, further comprising a secondary oxidant control valve in the secondary oxidant supply line adapted to modulate a secondary oxidant flowrate through the secondary oxidant supply line during a transient condition of the turbine in response to a variation in a load on the turbine.

5. The turbine system of claim 4, further comprising a main oxidant control valve in the main oxidant supply line, and a control unit;
wherein the control unit is adapted to selectively open and close the secondary oxidant control valve and the main oxidant control valve in response to the variation in the load on the turbine.

6. The turbine system of claim 5, wherein the control unit is adapted to perform the following steps:
increasing or decreasing a secondary oxidant flowrate through the secondary oxidant control valve in response to an increase or decrease of the load on the turbine;
subsequently decreasing or increasing the secondary oxidant flowrate through the secondary oxidant control valve and simultaneously increasing or decreasing a main oxidant flowrate through the main oxidant control valve, maintaining an constant oxidant flowrate to the combustor.

7. The turbine system of claim 1, further comprising:
a main oxidant flowmeter adapted to detect oxidant flowrate in the main oxidant supply line;
a secondary oxidant flowmeter adapted to detect oxidant flowrate in the secondary oxidant supply line;
a secondary oxidant control valve adapted to adjust the oxidant flowrate in the secondary oxidant supply line;
a control unit adapted to act upon the secondary oxidant control valve fs based on detection signals from the main oxidant flowmeter and the secondary oxidant flowmeter.

8. The turbine system of claim 7, further comprising a fuel flowmeter adapted to detect the fuel flowrate through the fuel supply line; and wherein the control unit is adapted to act upon the secondary oxidant control valve based on a detection signal from the fuel flowmeter in combination with detection signals from the main oxidant flowmeter and the secondary oxidant flowmeter.

9. A method for operation of a turbine system, the method comprising:
supplying a fuel stream to a combustor through a fuel supply line; supplying a main oxidant stream to the combustor through a heat exchanger;
combusting fuel from the fuel supply line, and oxidant in the combustor and generating a stream of pressurized hot combustion gas; expanding the combustion gas in a turbine and generating mechanical power therewith;
discharging exhaust combustion gas from the turbine;
flowing the exhaust combustion gas in the heat exchanger in heat exchange with the main oxidant stream, whereby the exhaust combustion gas is chilled and the main oxidant stream is heated;
recycling a first chilled combustion gas stream through the heat exchanger to the combustor as working fluid and discharging a second chilled combustion gas stream;
supplying a secondary oxidant stream to the fuel stream and blending the secondary oxidant stream in the fuel stream upstream of a fuel control valve arranged in the fuel supply line to form a blend of oxidant and fuel; and
supplying the blend of oxidant and fuel to the combustor.

10. The method of claim 9, wherein the blend of oxidant and fuel is supplied to a plurality of fuel nozzles of the combustor.

11. The method of claim 9, further comprising a step of modulating a flowrate of the secondary oxidant stream in response to a load variation on the turbine.

12. The method of claim 9, further comprising the following steps:
increasing or decreasing a secondary oxidant flowrate through a secondary oxidant control valve in response to an increase or decrease of a load on the turbine;
subsequently decreasing or increasing the secondary oxidant flowrate through the secondary oxidant control valve and simultaneously increasing or decreasing a main oxidant flowrate through a main oxidant control valve, maintaining a constant oxidant flowrate to the combustor.

13. The method of claim 9, further comprising a step of capturing carbon dioxide from the second chilled combustion gas stream.

14. The method of claim 9, wherein the secondary oxidant stream is supplied through a secondary oxidant supply line which bypasses the heat exchanger.

* * * * *